(12) United States Patent
Lentz et al.

(10) Patent No.: US 9,613,447 B2
(45) Date of Patent: Apr. 4, 2017

(54) IDENTIFYING CYCLIC PATTERNS OF COMPLEX EVENTS

(71) Applicant: International Business Machines Corporation, Armonk, NY (US)

(72) Inventors: James L. Lentz, Austin, TX (US); Jung W. Van, Cedar Park, TX (US); Yee Pin Yheng, Milpitas, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 14/611,736

(22) Filed: Feb. 2, 2015

(65) Prior Publication Data

US 2016/0225171 A1    Aug. 4, 2016

(51) Int. Cl.
G06T 11/60 (2006.01)
G06T 11/20 (2006.01)

(52) U.S. Cl.
CPC ............ G06T 11/206 (2013.01); G06T 11/60 (2013.01); G06T 2207/20072 (2013.01)

(58) Field of Classification Search
CPC .................................................... G06T 11/206
See application file for complete search history.

(56) References Cited

U.S. PATENT DOCUMENTS

| 8,103,966 | B2 | 1/2012 | Sabato et al. |
| 8,806,361 | B1* | 8/2014 | Noel ............ G06F 3/0484 |
| | | | 715/771 |
| 2004/0212636 | A1 | 10/2004 | Stata et al. |
| 2008/0081594 | A1 | 4/2008 | Lee |
| 2012/0137367 | A1 | 5/2012 | Dupont et al. |
| 2015/0205937 | A1* | 7/2015 | Hazeltine ...... G06F 19/3487 |
| | | | 434/127 |
| 2015/0294275 | A1* | 10/2015 | Richardson ...... G06T 19/00 |
| | | | 705/7.18 |

OTHER PUBLICATIONS

Karam, GM.; "Visualization using timelines"; SIGSOFT Software Engineering Notes, Spec. Issue., pp. 125-137; 1994.
Liu et al.; "Convenient Bar Style Event Manager Over the Unlimited timeline"; An IP.com Prior Art Database Technical Disclosure; http://ip.com/IPCOM/000238149; Aug. 5, 2014.
Cheng et al., "Representing Cyclic Change in Polar Coordinate Systems", http://citeseerx.ist.psu.edu/viewdoc/download?doi=10.1.1.104.6753&rep=rep1&type=pdf, Jul. 2005, 8 pages.

(Continued)

Primary Examiner — Jeffrey Chow
(74) Attorney, Agent, or Firm — Nicholas Bowman; Edell, Shapiro & Finnan, LLC

(57) ABSTRACT

Data within a database are displayed to discover patterns of events in time-based data. A first display of a linear timeline indicating events within time-based data is provided. The linear timeline of the first display may be transformed into a second display to cluster the events within the time-based data, where the second display includes one or more from the group of a stacked linear timeline of the events, a polar (annular) timeline of the events, and a helical timeline of the events. Patterns of the events are revealed within the second display to identify event associations.

20 Claims, 12 Drawing Sheets

(56) References Cited

OTHER PUBLICATIONS

Onclinx et al., "Projection of time series with periodicity on a sphere", ESTSP'2008 proceedings, European Symposium on Time Series Prediction, Porvoo (Finland), Sep. 17-19, 2009, pp. 47-56.
Grossman et al., "Multi-Finger Gestural Interaction with 3D Volumetric Displays", UIST '04: Oct. 24-27, 2004, Santa Fe, New Mexico, Copyright 2004 ACM 1-58113-957-08/04-0010 . . . , vol. 6, Issue 2, pp. 61-70.
"Introduction to Manipulate", Wolfram Language Tutorial, http://reference.wolfram.com/language/tutorial/IntroductionToManipulate.html, May 17, 2007, 45 pages.
Weber et al., "Visualizing Time-Series on Spirals", http://ieg.ifs.tuwien.ac.at/~aigner/teaching/ws06/infovis_ue/papers/spiralgraph_weber01visualizing.pdf, Apr. 3, 2001, 6 pages.
"Polar Graphs", OriginLab Corporation, http://www.originlab.com/index.aspx?go=Products/Origin/Graphing/Polar &gclid=CPiPpcvoqb4CFcpQ7Aodn11AOw, accessed May 28, 2014, 3 pages.
Tran, "Time cylinder to represent data of temporal objects", Control, Automation and Information Sciences (ICCAIS), 2012 International Conference, Copyright 2014 IEEE, pp. 387-391.
Geo Time Spiral Diagram, http://www.life.illinois.edu/mcb/419/images/GeoTimeSpiral.jpg, accessed from internet Nov. 12, 2014.

* cited by examiner

IDENTIFYING CYCLIC PATTERNS OF COMPLEX EVENTS

BACKGROUND

Present invention embodiments relate to manipulating states of data graphics, and more specifically, to manipulating states of time series data graphics to reveal event cycles.

Analysis of data or data analytics is a process of examining raw data to obtain useful information. For example, current techniques to explore time series data include examining multiple data displays or timelines. However, these techniques are laborious processes, and a user may not recognize certain insights when specific displays presenting the time series data have the data grouped differently or use different time scales.

SUMMARY

According to one embodiment of the present invention, patterns of events are revealed in time-based data. A first display of a linear timeline indicates events within time-based data. The linear timeline of the first display is transformed into a second display that presents clustering of the events within the time-based data, where the second display includes one or more from the group of a stacked linear timeline of the events, a polar timeline of the events, and a helical timeline of the events. Patterns of the events may be revealed within the second display to identify event associations.

Embodiments of the present invention further include a method, a system and computer program product for revealing patterns of events in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
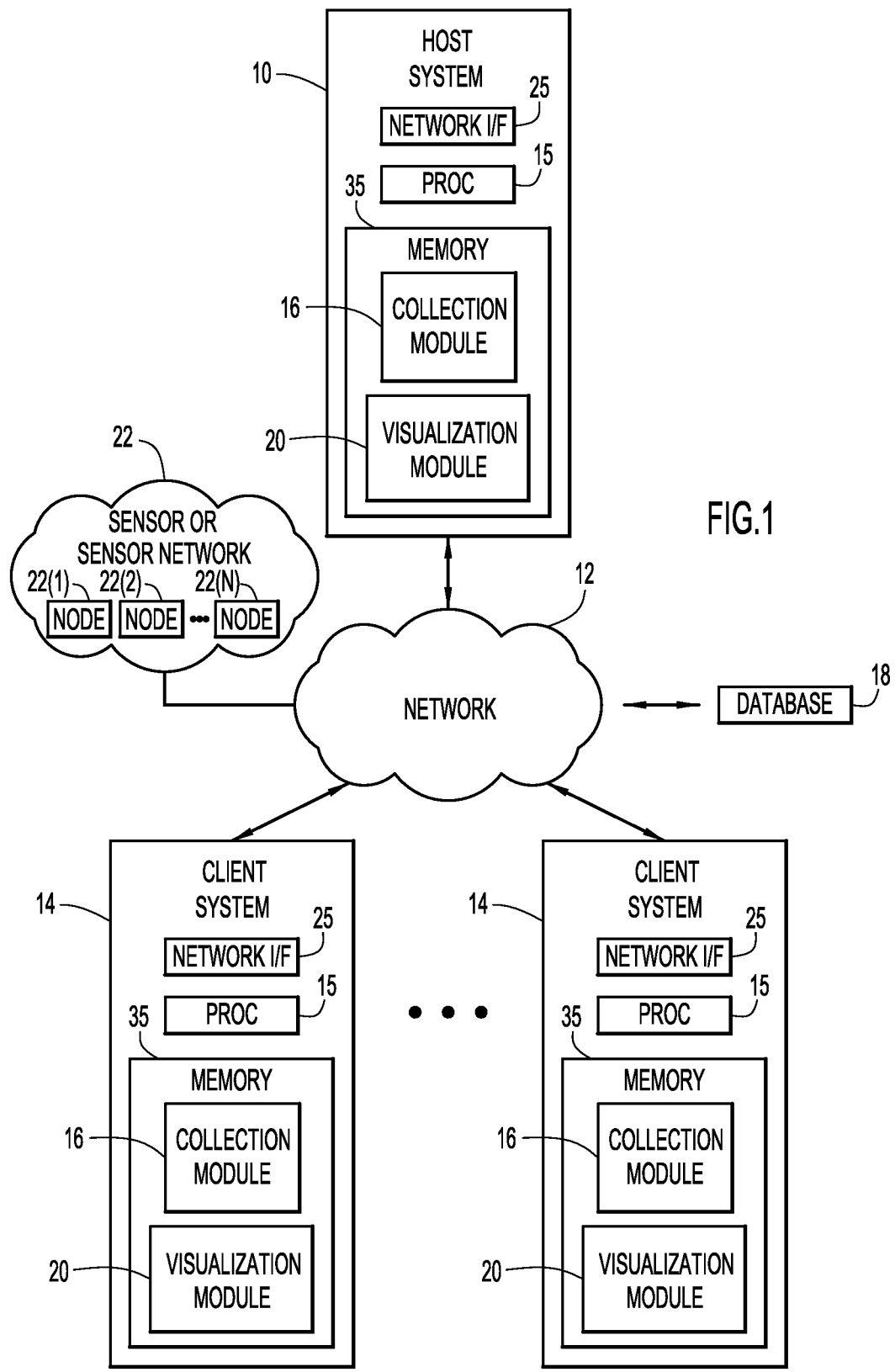
FIG. 1 is a diagrammatic illustration of an example computing environment for use with an embodiment of the present invention.

The techniques of present invention embodiments provide a mechanism to visually inspect and/or understand the nature of data using various forms of visualization that can be readily manipulated. In particular, the temporal nature of events by type may be analyzed to gain insight or information about the ongoing operations (of a business, system, or other entity) and then enable a decision maker to make more well informed decisions. In many cases, the decision may be automated using an event-rule combination. In this regard, an event may be considered a signal or series of signals that indicate a change of state has occurred in a given system, while a rule may be a logic statement that indicates that a decision should be made or that an action should be taken. For example, a rule may be that if a bank account goes below a certain balance, then notify the account owner. Accordingly, when an event such as a bank account withdrawal results in the bank account going below the certain balance, the rule is triggered and the bank account owner is notified.

A decision system may use distributed, autonomous rule processing components referred to as "agents." The agents may be deployed at, and receive information from, various locations (e.g., from sensors in a sensor network). Receipt of an event message by an agent may cause the agent to fire or start to execute one or more rules. These rules process information that may be included in the payload of the message and initiate actions, if any, selected by the logic of the one or more rules. These actions may include firing other event messages or initiating additional processing by application components and services (e.g., as prescribed as part of the decision system).

A rule analyst (or other user) may be responsible for authoring, debugging, and improving the set of rules that drive decisions. When troubleshooting complex business or other events, these users need to understand the flow of events that lead to particular outcomes. The factors affecting outcomes and performance may not be completely understood, so the user may need to explore multiple hypotheses in order to identify problems or ways in which sets of rules may be improved. Accordingly, decision systems can be applied to a vast number of business or other problems, in a wide variety of domains such as financial services, transportation, banking, and healthcare, to name just a few. To provide an illustrative example, an air transportation system is described herein as an example application and it should be understood that the concepts described apply to many other domains.

Since these decision systems process events, the time and place of the events may be particularly important to the decision making processes. In other words, the time (e.g., the temporal nature of the event), as well as the place (e.g., the spatial or geolocation of the event) may have an impact on the best decision to make or rule to execute. A decision system typically includes a vast number of components interacting in real time. There may be hundreds or thousands of agents of various types and a similarly large number of objects (e.g. people, airplanes, airports, flight numbers, and so forth), and even greater numbers of events flowing through the system. The complexity of this system poses challenges in monitoring and analyzing the behavior of the system.

Time of day is a particularly important variable in the affairs of human beings. For example, in an air transportation example, flight traffic through airports usually begins around 6:00 A.M. with the first departures and often ends sometime around midnight with the last arrival, while overnight shipping services fly in the interim hours of the night. Other systems with events (e.g., e-commerce, hospital data systems, taxi cab dispatching, etc.) may have other patterns related to time of day. Some systems with events may also have feedback loops creating clusters of events at any number of intervals.

Approaches to debug event processing applications rely on log files and multiple data displays and timelines. However, the techniques of present invention embodiments described herein provide visualization transformations to provide a way of enabling monitoring of complex systems' behavior and for investigating cyclic or circadian patterns to readily identify problems, or so that processing rules can be improved. The present invention embodiments may be utilized for various scenarios (e.g., assist in debugging the event processing applications, monitoring system behavior, exploratory data analysis, etc.). Example display or visualization transformations are described below in connection with FIGS. 6-13.

The techniques of present invention embodiments described herein provide mechanisms for quickly transforming cyclic data displays to reveal temporal patterns. Present invention embodiments rapidly reconfigure data displays in order to enable identification (e.g., by a user or system) of patterns of events for subsequent analysis. The rapid transformation of the presentation of data allows the user (or system) to identify arbitrary patterns (e.g., anything that looks like a pattern). This enables a user to gather a deeper understanding of the nature of the data by allowing the data to be presented in different perspectives which may reveal patterns. The configuration of events in alternative displays may make patterns of events apparent to the user that were not discernable in one or more prior displays. The user (or system) may take action based on the pattern. For example, in the context of event processing applications (e.g., applications that act on events and patterns of events), revealing potential patterns enables development of rules to respond to identified patterns.

An example environment for use with present invention embodiments is illustrated in FIG. 1. Specifically, the environment includes one or more server or host systems 10, and one or more client systems 14. Host systems 10 and client systems 14 may be remote from each other and communicate over a network 12. The network may be implemented by any number of any suitable communications media (e.g., wide area network (WAN), local area network (LAN), Internet, intranet, etc.). Alternatively, host systems 10 and client systems 14 may be local to each other, and communicate via any appropriate local communication medium (e.g., local area network (LAN), data center network, hardwire, wireless link, intranet, etc.). The environment in FIG. 1 further includes a sensor or sensor network 22 that may include a plurality of nodes 22(1)-22(N) coupled to host systems 10 and client systems 14 via network 12. Sensor network 22 may include any type of sensor or other mechanism for detecting any types of events or conditions and generating and sending event or other messages.

Host systems 10 and client systems 14 may be implemented by any conventional or other computer systems preferably equipped with a display or monitor (not shown), a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, collection module, visualization module, browser/interface software, etc.).

Client systems 14 may receive user query information related to desired database information (e.g., events, rule sets, etc.) to query host systems 10. In another example, the queries may be received by the hosts, either directly or indirectly. The host systems 10 may include a collection module 16 to collect event data (e.g., event type, location, time, etc.) from, for example, sensor network 22. The host systems 10 may also include a visualization module 20 to transform visual displays from one form or type to another using data collected by collection module 16 (e.g., to switch from a linear timeline to a polar or stacked linear representation).

One or more components of the host systems 10, network 12 and client systems 14 may comprise a database management system (DBMS) or database system 18. The database system 18 may use any conventional or other database, or storage unit. Other DBMS components may be local to or remote from host systems 10 and client systems 14, and may communicate via any appropriate communication medium such as network 12 (e.g., local area network (LAN), wide area network (WAN), Internet, hardwire, wireless link, intranet, etc.).

Any clients, hosts, or data servers may present a graphical user interface (e.g., GUI, etc.) or other interface (e.g., command line prompts, menu screens, etc.) to solicit information from users pertaining to rule sets, event data, queries, transforming visualizations and to provide results (e.g., query results, transformed visualizations, etc.). Further, these systems may provide reports to the user via the display or a printer, or may send the results or reports to another device/system for presenting to the user.

Alternatively, one or more hosts 10 or clients 14 may perform query processing when operating as a stand-alone unit. In a stand-alone mode of operation, the host/client stores or has access to the data (e.g., rule sets, event data, etc.), and includes collection module 16 to collect event data and visualization module 20 to allow transformation of event graphics that organize the event data collected by collection module 16. The graphical user interface (e.g., GUI, etc.) or other interface (e.g., command line prompts, menu screens, etc.) solicits information from a corresponding user pertaining to rule sets, event data, queries, transforming visualizations and may provide reports (e.g., query results, transformed visualizations, etc.).

Collection module 16 and visualization module 20 may include one or more modules or units to perform the various functions of present invention embodiments described below. The various modules (e.g., collection module, visualization module, etc.) may be implemented by any combination of any quantity of software and/or hardware modules or units, and may reside within memory 35 of the host systems and/or client systems for execution by processor 15. It should be understood, that the computing environment depicted in FIG. 1 provides example platforms (e.g., host systems 10, client systems 14) for illustrating the techniques described herein. In this regard, data and database storage on one host 10 or client 14 may have no relationship with data and database storage on another host 10 or client 14.

Sensor network 22 may contain sensors, nodes, or any other mechanism for recognizing an event, generating an event message, and sending the event message to a receiver (e.g., a collection agent may send an event message to collection module 16). Continuing with the air transportation example mentioned above, consider a system with thousands of airplanes operated by airlines and individuals, numerous airports, and hundreds of air traffic controllers in an air traffic controller (ATC) system. When an aircraft operated by airline XYZ takes off (a takeoff event) or lands (a landing event) both the airline XYZ and ATC are interested in the takeoff and landing events of the aircraft. In other words, both the airline XYZ and ATC have data analysis systems for managing their respective domains. For example, airline XYZ is interested in revenue per passenger mile and on time arrivals, while ATC is interested in the safe flow of traffic across its network of controlled airports.

Thus, when an aircraft takes off, the event may be catalogued in several ways. In one example, one of the pilots radios the dispatcher for airline XYZ and the dispatcher generates a takeoff event for the aircraft. Similarly, the tower controller at the departure airport may enter a takeoff event into the control console, which is forwarded to the ATC system (e.g., by an event agent), thereby notifying en route controllers that the particular aircraft is airborne.

In another example, should the parties be properly equipped, the takeoff may be logged automatically. The aircraft has a switch in one of the landing gear struts (e.g., a squat switch) that detects whether there is weight on the wheels. When the plane lifts off, the weight of the aircraft is removed from the wheels and the gear strut (i.e., piston or shock absorber like structure) expands, thereby releasing the switch. Accordingly, at landing, the strut recompresses and activates the switch in the opposite manner. The aircraft systems can use the switch position and automatically signal both the airline dispatch and ATC (e.g., using a local digital radio link or a satellite uplink) without human interaction. One such system that is in use for automated signaling and/or aircraft parameter tracking is the Aircraft Communications Addressing and Reporting System (ACARS). Thus, the various mechanisms for detecting and logging the events may act as sensor nodes (e.g., sensor nodes 22).

It should be noted, for purposes of illustration, that many types of sensors or sensor networks may be utilized (e.g., radiation sensors, weather sensors, fire or other disaster sensors, motion or presence sensors, diagnostic sensors, etc.). Accordingly, the techniques described herein may be applied to numerous scenarios.

Figure 2:
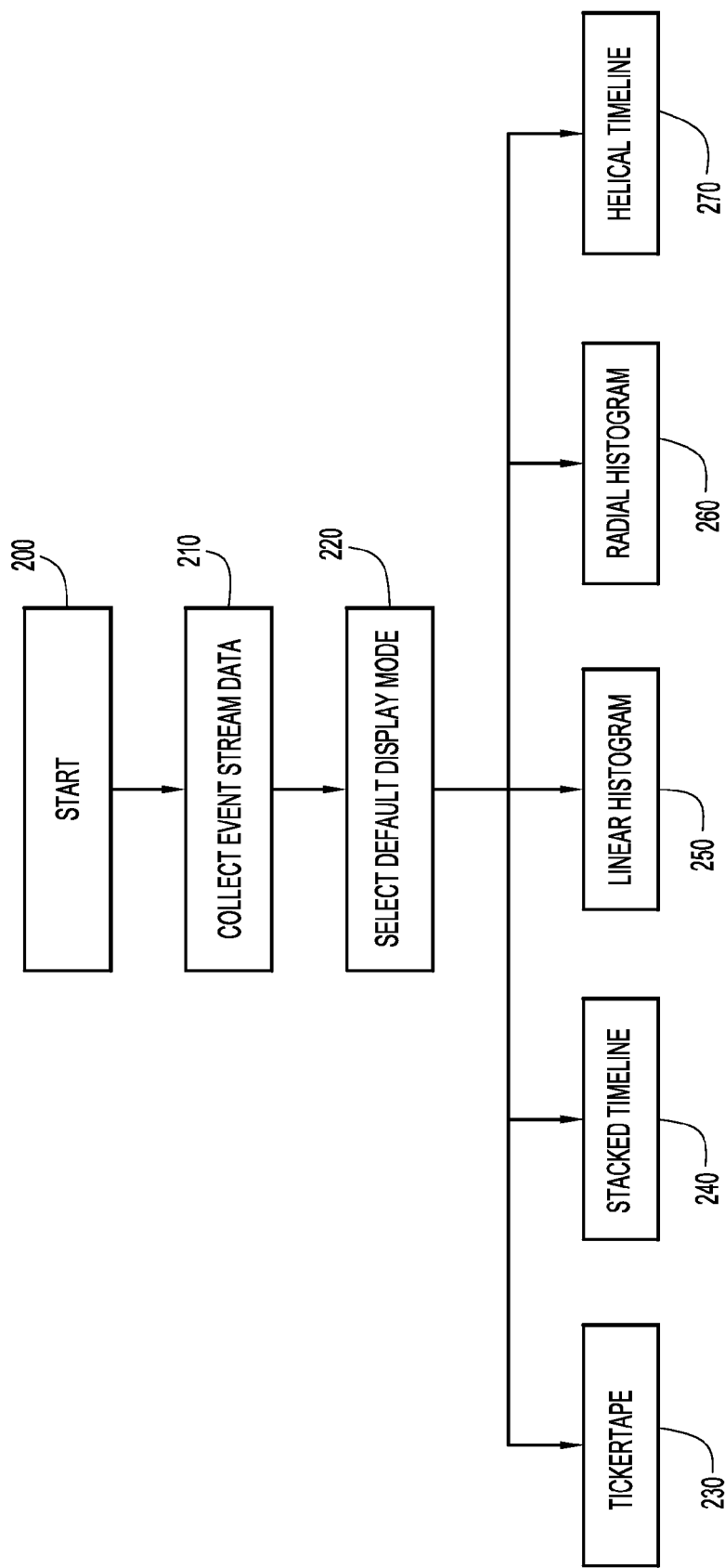
FIG. 2 is a flow diagram illustrating a manner in which collected event data are processed to generate a first display according to an embodiment of the present invention.

A manner in which collection module 16 and visualization module 20 (e.g., via a host system 10 and/or client systems 14) process event data for visual manipulation or visual transformation according to an embodiment of the present invention is illustrated in FIG. 2. Specifically, the process starts at step 200, and at step 210, event stream data are collected (e.g. by collection module 16). The event stream data are stored (e.g., in database 18) for analysis, either in real-time or at a later time. The event data collected at step 210 can be initially displayed in a variety of formats. A default display mode (format) is selected at step 220. The default format may be preset into the system or a user may be prompted for the format.

Figure 6:
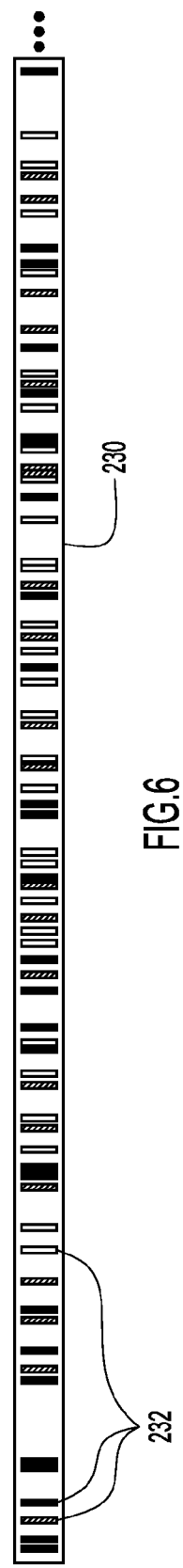
FIG. 6 is a diagram illustrating an example linear timeline (or tickertape) of events according to an embodiment of the present invention.
Figure 7:
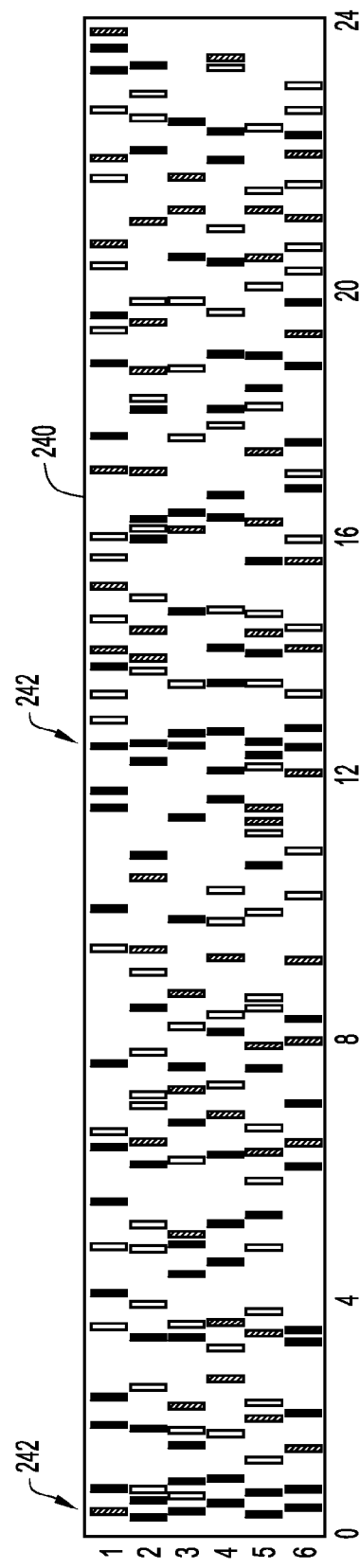
FIG. 7 is a diagram illustrating an example tickertape event timeline that has been transformed to a stacked linear display according to an embodiment of the present invention.
Figure 12A:
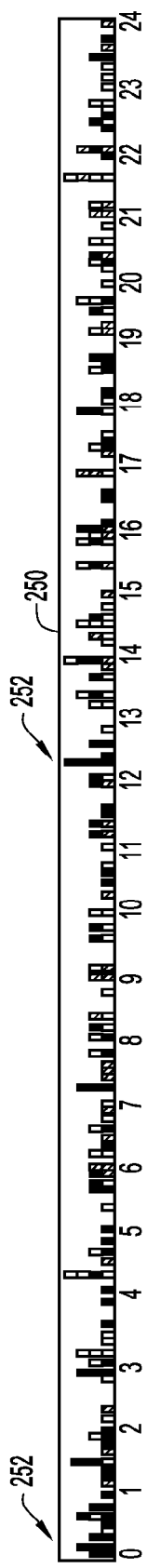
FIGS. 12A-12D are diagrams illustrating a timeline of events that has been further transformed into a radial view (or a cylindrical, polar or annular view) according to an embodiment of the present invention.
Figure 12B:
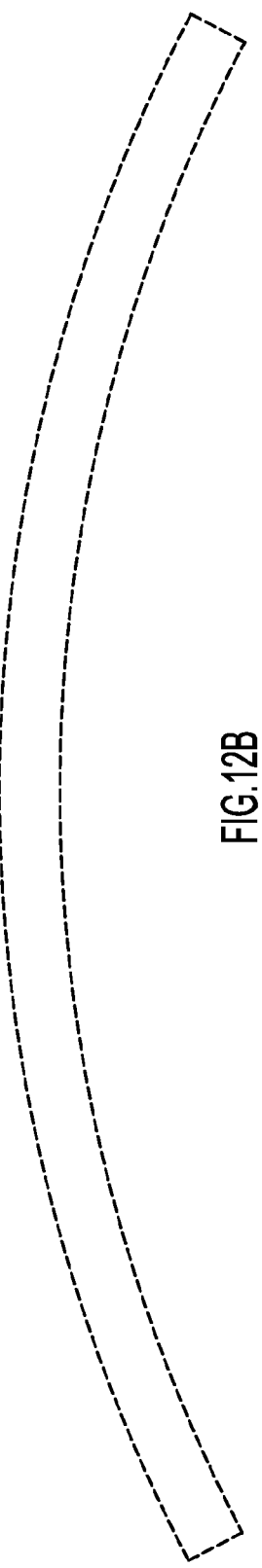
Figure 12C:
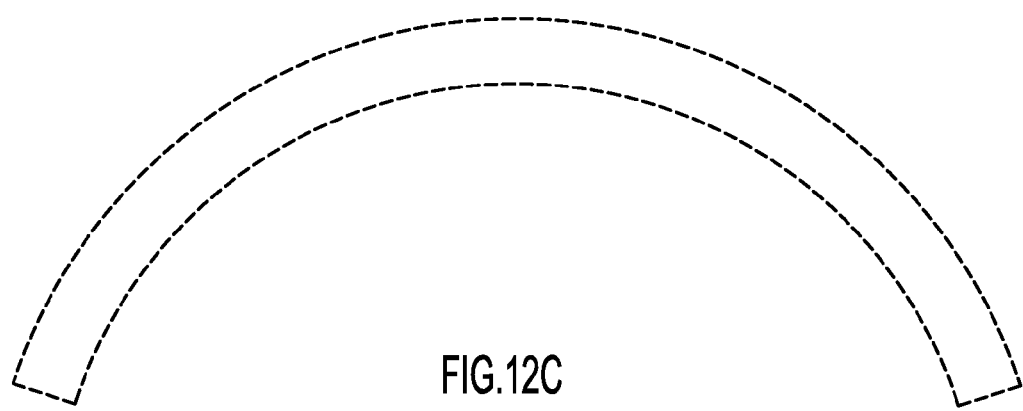
Figure 12D:
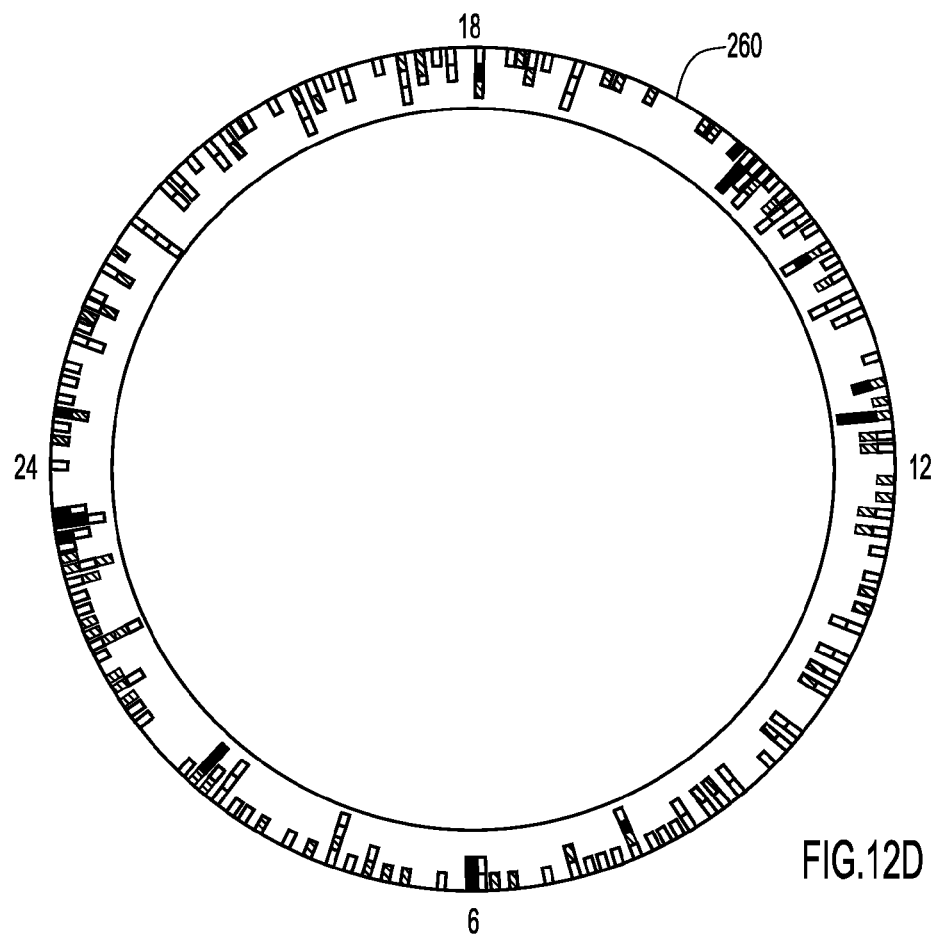
Figure 13:
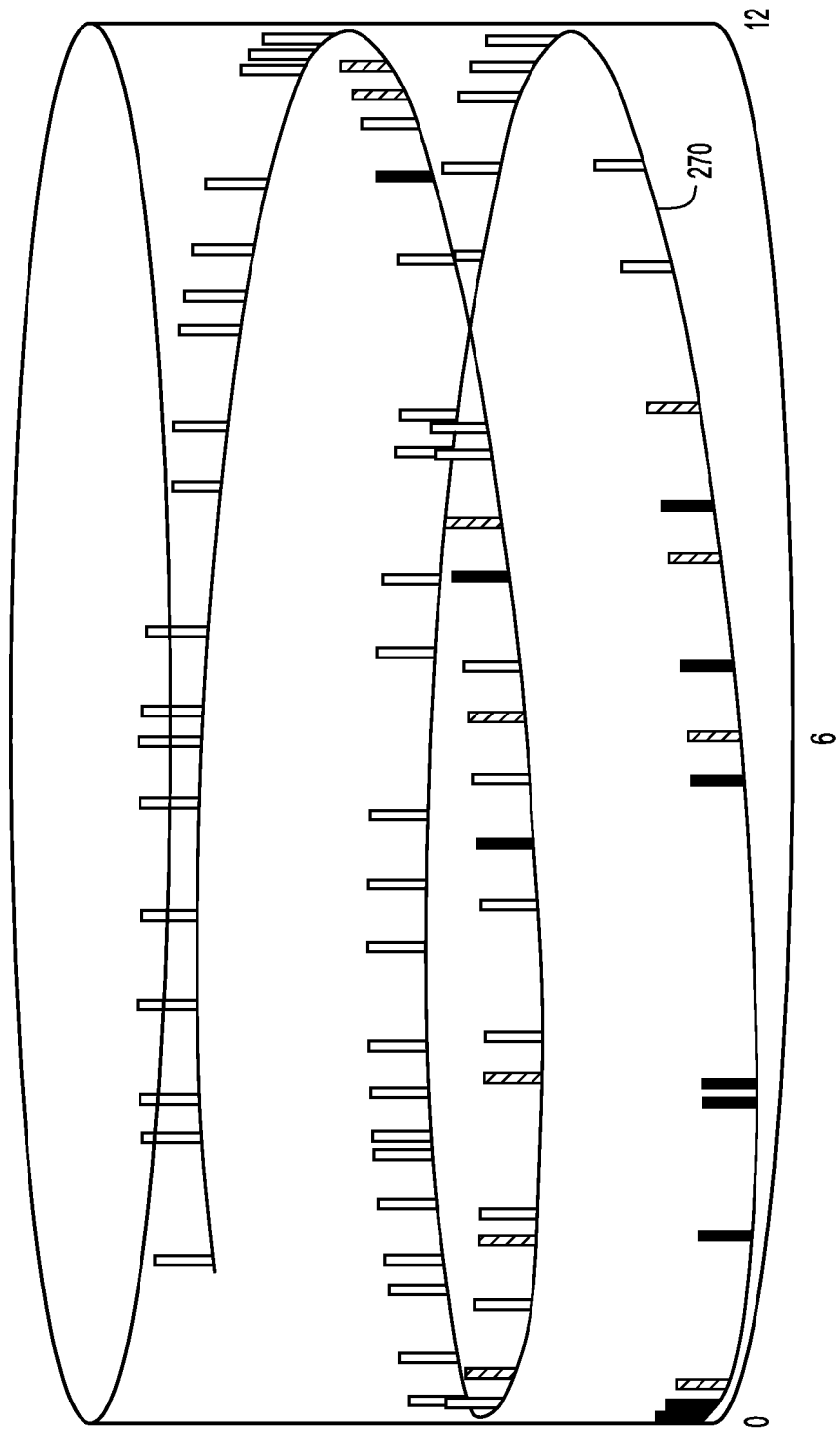
FIG. 13 is diagram illustrating an event timeline that has been transformed into a helical view according to an embodiment of the present invention.

As depicted in FIG. 2, the default display modes may be one of a linear or tickertape timeline 230, a stacked timeline 240, a linear histogram 250, a radial histogram 260, or a helical timeline 270. Conceptually, the radial histogram may also be considered a polar or annular histogram. An example tickertape timeline is shown in FIG. 6, an example stacked timeline is shown in FIG. 7, an example linear histogram is shown in FIG. 12A, an example radial histogram is shown in FIG. 12D, and an example helical timeline is shown in FIG. 13, each as described below. The display modes described herein are by way of example, and other display modes may be used to accommodate the given system, event types and/or rules base (rule set).

Once the default display mode is selected, one mode may be transformed into another mode using gesturing techniques. For example, when a user has access to a display with a touch screen, a common gesture is to "spread" fingers apart to magnify a particular portion of the display or "squeeze" fingers together to compress a particular portion of the display. In some systems a "double tap" on the screen will cause a preset magnification at the double tap location or if the display is already magnified, the double tap will cause the display to return to the original magnification level. It should be understood that gestures may be provided along any axis (e.g., horizontal, vertical, diagonal/radial, polar, etc.) or for any rotational mode (e.g., bend, wrap, unwrap, unbend (straighten), etc.). Alternatively, the same gestures may be made by a standard or specialized pointing device (e.g. a mouse), or other device (e.g., a digitizer or drawing tablet). In addition, the actions associated with the gestures may alternatively be triggered by any type of input device (e.g., mouse, keyboard, voice recognition, touch screen, etc.). For example, a list of the gestures (or descriptions of the actions) may be presented, and the desired actions selected by any type of input device (e.g., mouse, keyboard, voice recognition, touch screen, etc.).

Figure 3:
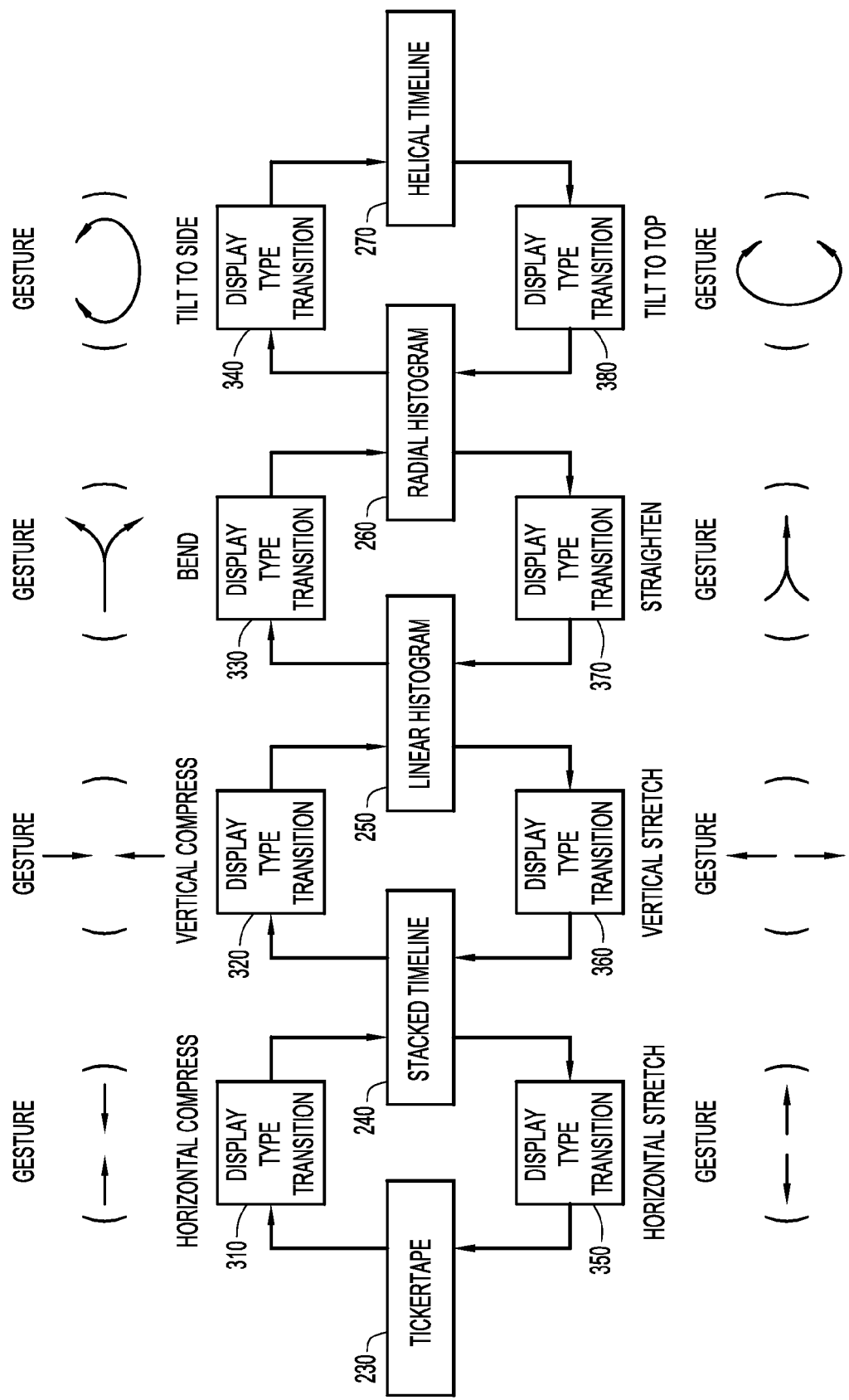
FIG. 3 is a flow diagram illustrating a manner in which a first display is transformed into a second display by way of a gesture mechanism according to an embodiment of the present invention.

An example flow diagram illustrating a manner in which a first display is transformed into second display according to an embodiment of the present invention is illustrated in FIG. 3. In this example, a first display may start as the default display as described above, and a second display is generated from the first display. FIG. 3 depicts the tickertape timeline 230, stacked timeline 240, linear histogram 250, radial histogram 260, and helical timeline 270 from FIG. 2 as example display modes that can be transformed from one display mode to another.

The upper portion of FIG. 3 depicts display mode transition possibilities from left to right, and the lower portion of FIG. 3 depicts display mode transition possibilities to perform the reverse display transformation. As viewed in FIG. 3, tickertape mode 230 may be transformed into stacked timeline 240 using a display type (or mode) transition 310 using a horizontal compress gesture as described above (e.g., squeezing fingers together horizontally on a touch screen interface to compress a particular portion of the display). Briefly, referring to FIG. 6 a tickertape display 230 includes different event types 232 depicted by shading on a horizontal timeline with the earlier events leftmost and later events depicted to the right. The events are presented in the tickertape based on the time of their occurrence within the time interval.

Once tickertape 230 is compressed into stacked timeline 240, the results are shown by way of example in FIG. 7. Transformed tickertape data are represented in FIG. 7, by way of example, in 24-hour intervals or days. For ease of illustration, it may be assumed that six days of data are included in the original tickertape data set. The data on the horizontal axis represents hours of a 24-hour time interval while units of days (or 24-hour intervals) are represented on the vertical axis (i.e., represented as days 1 to 6). The events are presented based on the time of their occurrence within the appropriate hours of each day. Accordingly, the earlier events in FIG. 7 reside on the upper left of the figure and the events run from left-to-right and top-to-bottom to the later events on the lower right of the figure (e.g., via an event wrapping or modulus operation based on the time of day in the 24-hour interval).

The visualization of the stacked timeline shown in FIG. 7 clusters events of the same type near a same time of day (or events at the particular time of day) across several days. For example, there appears to be a slight clustering of like events 242 just after both the zero hour and the $12^{th}$ hour (e.g., as shown by solid bars as viewed from day one (top) to day six (bottom).

Figure 8:
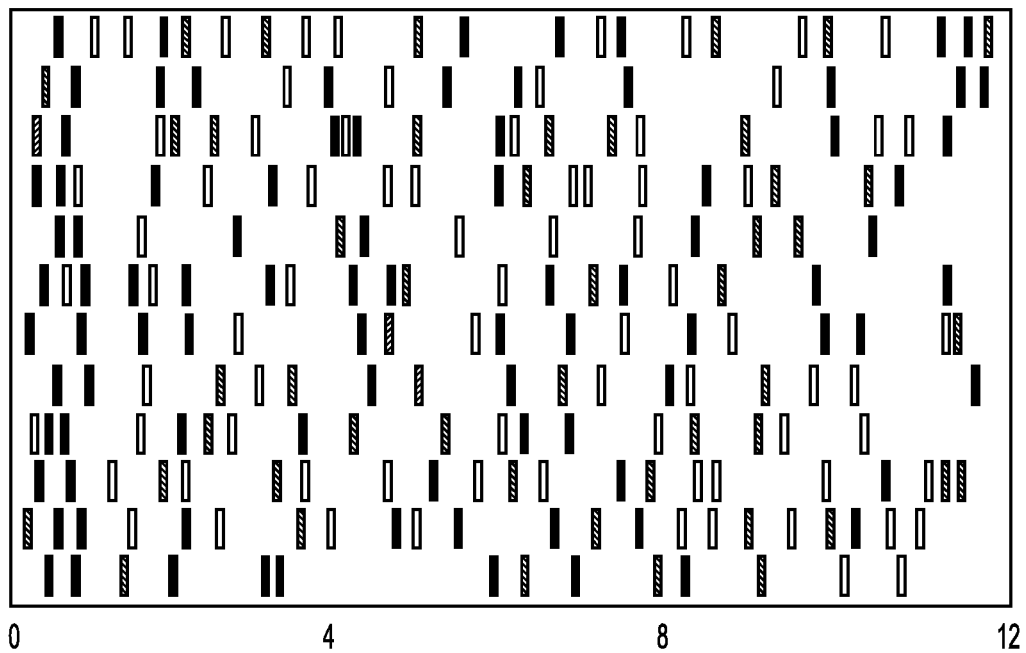
FIG. 8 is a diagram illustrating the stacked linear display of FIG. 7 that has been further transformed by wrapping the events into smaller time intervals according to an embodiment of the present invention.

To reverse the display type transition performed at step 310 (e.g., made by a horizontal compression gesture), an expansion of the stacked timeline 240 back to a tickertape timeline 230 may be performed using a horizontal stretch gesture 350 (e.g., moving fingers apart on a touch screen interface, etc.). Alternatively, the stacked timeline 240 may be further compressed by a horizontal compression gesture as shown in FIG. 8. The example event graphic depicted in FIG. 8 shows the stacked timeline of FIG. 7 (e.g., in 24-hour intervals or days) wrapped into 12-hour intervals. The data on the horizontal axis has been compressed into a 12-hour interval, while the vertical axis represents half-days or 12-hour intervals. The events are presented based on the time of their occurrence within the appropriate hours of each half-day. As in FIG. 7, the earlier events in FIG. 8 reside on the upper left of the figure and the events run from left-to-right and top-to-bottom to the later events on the lower right of the figure via an event wrapping or modulus operation based on the 12-hour intervals.

Figure 9:
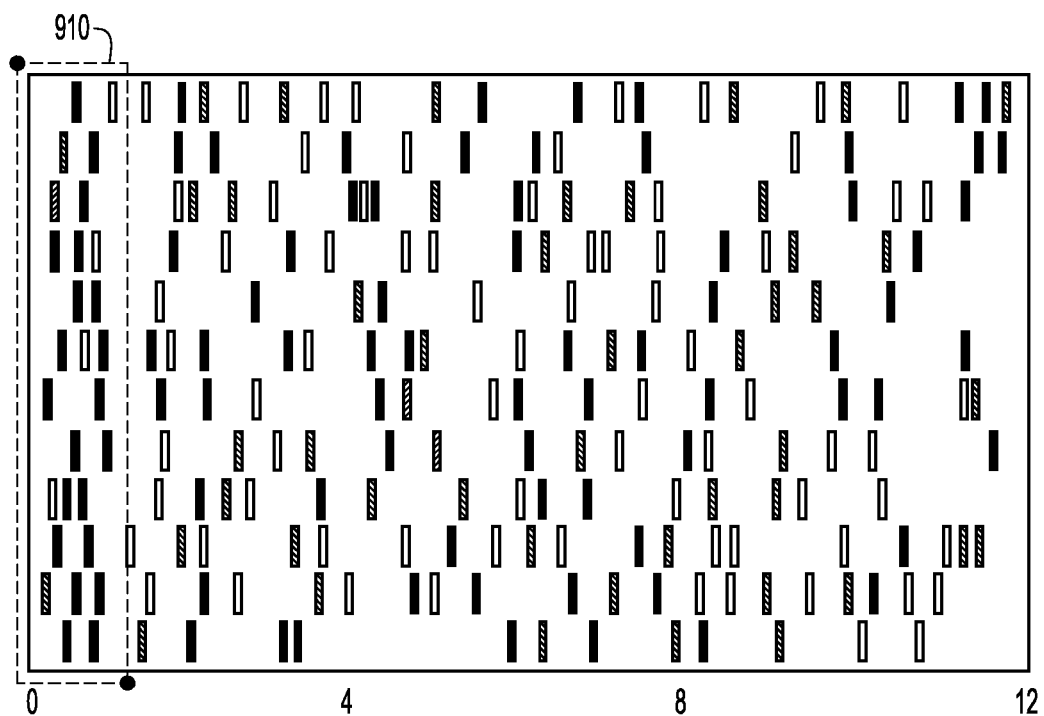
FIG. 9 is a diagram illustrating the events of FIG. 8 in which certain events form a visually identifiable cluster according to an embodiment of the present invention.

Referring now to FIG. 9, the stacked timeline of FIG. 8 is depicted with a dashed box 910 surrounding a leftmost portion of the figure from the zero hour. As viewed in FIG. 9, a cluster of like events (e.g., as shown by solid bars) is concentrated in box 910, while a similar concentration of like events is visually absent throughout the remainder of the figure. In this regard, the relative concentration of events may constitute an actionable event as determined by an analyst and/or the system (e.g., via a software agent (e.g., visualization module 20) that assists in highlighting data anomalies).

By transforming the 24-hour stacked timeline as shown in FIG. 7 into the 12-hour stacked timeline shown in FIG. 9, the minor concentrations of events (solid bars) shown in FIG. 7 just after the zero hour and the twelfth hour become more pronounced as highlighted by dashed box 910. Accordingly, the like events represented by the solid bars form a nexus at 12-hour intervals (i.e., the events have a 12-hour cyclic or circadian pattern) that may not be readily apparent (but perceivable) in the 24-hour view.

By way of example, the blank or white filled bars may represent an aircraft takeoff event, the hash filled bars may represent an aircraft landing event and the solid bars may represent an aircraft that has been delayed on the ground before takeoff (e.g., by a predetermined delay). Accordingly, as viewed in FIG. 9, many of the delayed aircraft tend to cluster at 12-hour (circadian) intervals.

The delayed takeoff events clustered at 12-hour intervals would likely suggest (e.g., to an analyst, system, etc.) that something is occurring every 12 hours that delays takeoff. At this point, additional data may be added to the stacked timeline (e.g., potential causes, or causation reports), while extraneous data may be removed (e.g., remove data pertaining to on time takeoffs and landings that are not issues for the airline). For example, the pilot may have to file a report as to why the aircraft was delayed. Some example causes may be: waiting on maintenance, waiting on food service, or that the fuel load was incorrect. These potential issues may be traced to their respective sources. In a simple example, it may turn out that maintenance shifts were improperly scheduled, thereby rendering a slow response to aircraft maintenance issues.

The visualization transform techniques described herein may be further used to transform the stacked timeline 240 into a linear histogram 250 by way of a vertical compress gesture (e.g., vertically squeezing fingers together on a touch screen interface, etc.) at step 320 (FIG. 3). An example linear histogram is depicted in FIG. 12A. The linear histogram depicts a frequency of events at a given time (e.g., a given time of day for a 24-hour interval) across the defined time interval. The events are presented based on the time of their occurrence within the appropriate hours, where events with the a common time of occurrence are stacked. As in the previous examples, a clustering of solid bars 252 may be discerned near the both the zero hour and the twelfth hour (e.g., as shown by solid bars). The linear histogram 250 may be transformed back to a stacked timeline by way of a vertical stretch gesture (e.g., vertically moving fingers apart on a touch screen interface, etc.) at step 360. The linear histogram 250 may also be further compressed to reveal, perhaps, a more pronounced view of the data 910 from FIG. 9.

Another transform of the linear histogram may be had by way of a bending gesture 330. The bending gesture 330 may be made by a slight linear motion on a touch screen interface followed by curve motion toward the axis perpendicular to slight linear motion axis (e.g., as indicated above display transition step 330). It should be understood that fingers operating in like form may be used to create a circular "wrapping" gesture. For example, the linear histogram shown in FIG. 12A may be bent by a finger gesture designed to transform the linear histogram into a circular histogram. As the linear histogram is transformed, it starts to bend as shown in FIG. 12B, with a further bending moment depicted in FIG. 12C. When the gesture is complete enough for the system to "recognize" the desired end form, the display may "snap" to the radial histogram 260 and shown, by way of example, in FIG. 12D. The radial histogram 260 is basically a circular version of the linear histogram, and may be reverted back to a linear histogram by way of "grabbing" disparate radial portions of the radial histogram 260 on a touch screen interface and merging the gesture to at least a slight linear motion along the desired axis (e.g., as indicated by the merging gesture below display transition at step 370).

In a further example, the radial histogram 260 may be manipulated or transformed into a helical timeline or histogram 270, as shown in FIG. 13 by using a tilt to side (left or right) gesture 340 (e.g., on a touch screen interface). The helical timeline includes a helix or helical or spiral axis (e.g., within a cylinder with perimeter and height dimensions representing time), and events presented on the helix in accordance with a time of their occurrence. The display may be reversed from a helical display 270 to a radial histogram 260, using a tilt to top (or bottom) gesture 380 (e.g., on a touch screen interface). It should be understood that any of the gesturing techniques may be adapted to provide visualization transitions from any graphic form to another (e.g., helical timeline/histogram 270 may be transformed to a tickertape 230 with a defined transformation gesture) and for any perspectives or orientations (e.g., right to left, left to right, top to bottom, bottom to top, etc.).

Figure 4:
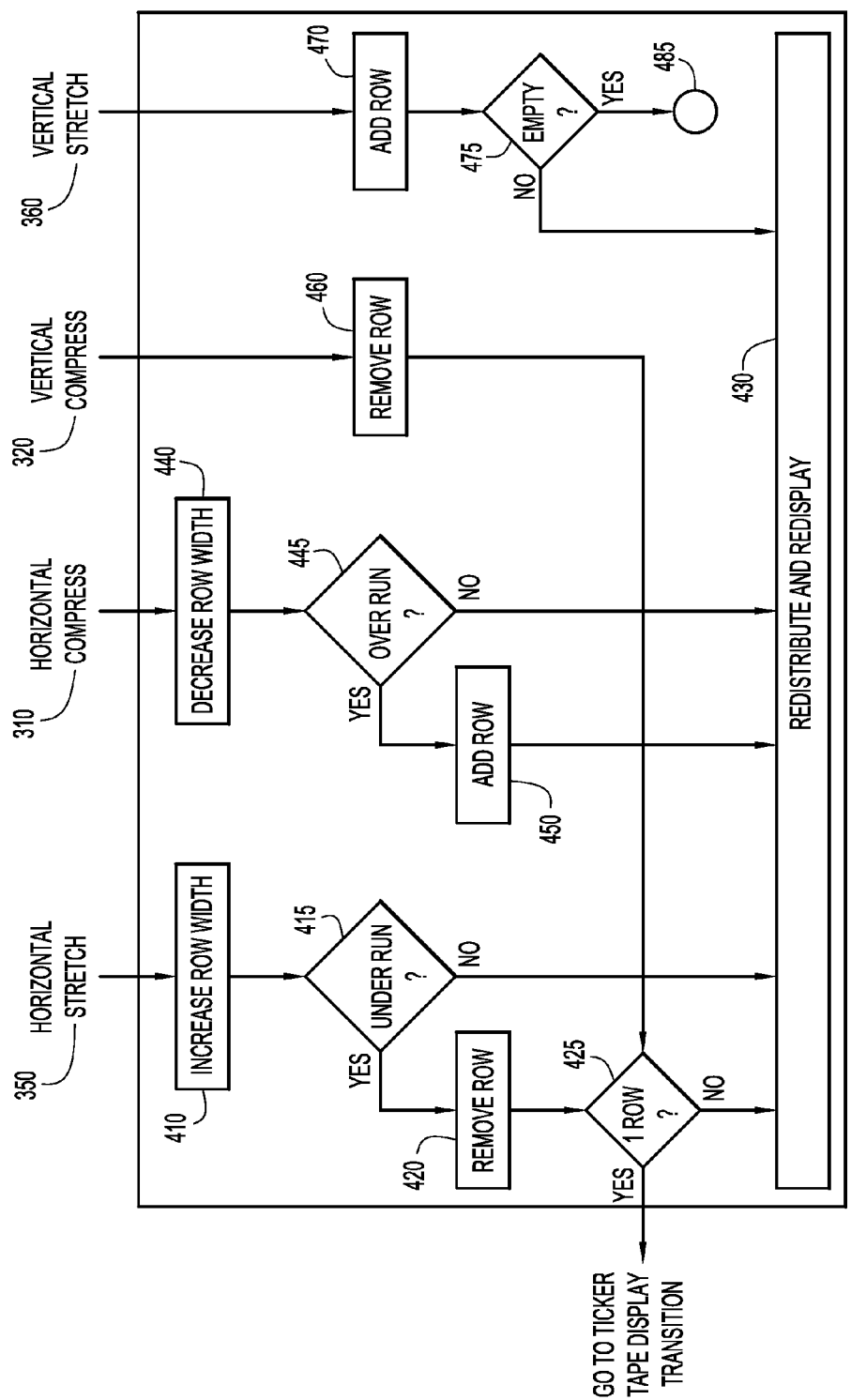
FIG. 4 is a flow diagram illustrating a manner in which various gestures transform a given first display into a given second display according to an embodiment of the present invention

Example gesture logic (e.g., of visualization module 20) is further shown in FIG. 4. A horizontal stretch gesture 350, a horizontal compress gesture 310, a vertical compress gesture 320 and a vertical stretch gesture 360 are depicted across the top of the figure.

When a horizontal stretch gesture 350 is initiated, the underlying graphic is stretched horizontally to a desired scale or form a graphic with a desired horizontal scaling width. Accordingly, the relative change in a given graphic may be based on the scale relative the transformational gesture.

Accordingly, with stacked events (e.g., FIGS. 7-11), a horizontal stretch increases row width (or the time interval represented by each row) at step 410. It is determined whether there is a row under run at step 415. If there is a row under run (e.g., no events within the adjusted time interval for a given row), the row is removed at step 420. At some point, if the stacked linear graphic becomes stretched enough, it is determined if a single row remains at step 425. If a single row remains, the display transitions to a tickertape display, otherwise, the event data are redistributed and redisplayed based on time of occurrence at step 430 (e.g., by visualization module 20). It should be understood that the event data may be redistributed and displayed during the gesture or after gesture release.

Figure 10:
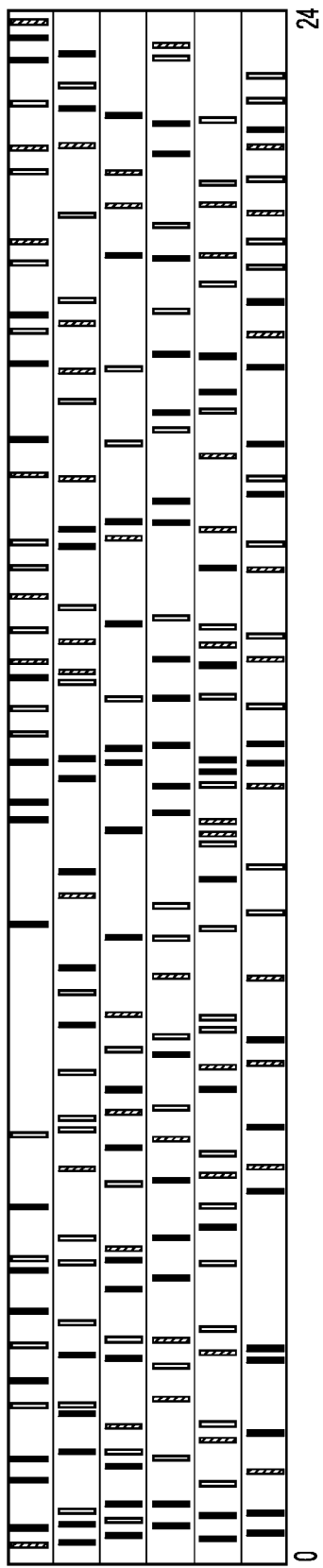
FIG. 10 is a diagram illustrating an example tickertape event timeline that has been transformed by wrapping or compressing the events into time intervals according to an embodiment of the present invention.
Figure 11:
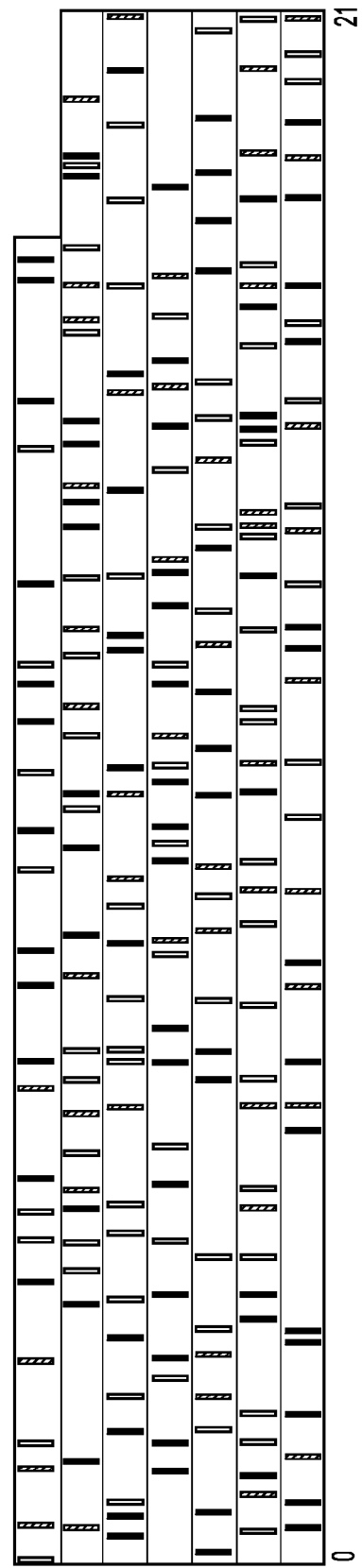
FIG. 11 is a diagram illustrating the events of FIG. 10 that have been further transformed by collapsing the events into a smaller time interval according to an embodiment of the present invention.

When a horizontal compress gesture 310 is initiated, the underlying graphic is compressed horizontally and the row width (or time interval represented by each row) is decreased at step 440. It is determined whether a row overrun has occurred at step 445 (e.g., additional events in the row beyond the adjusted time interval). As the event data are compressed, event data that overruns is added to a new row at step 450. By way of example, FIG. 10 depicts six days of 24 hour data similar to the data shown in FIG. 7. In this example, a compression gesture is applied to the stacked linear graphic of FIG. 10 to form a stacked timeline with a 21-hour interval shown in FIG. 11. The overrun (spillover or remainder) values, when they do not fill a given continuous or discrete interval, may be used to form a new row at the top or bottom of the display depending on the underlying scaling definitions (e.g., in FIG. 11, the overflow event data are shown on the top row).

When a vertical compress gesture 320 is initiated, the underlying graphic is compressed vertically and rows are removed at step 460. As the rows are removed, event data may be stacked to form a histogram. It is determined if a single row remains at step 425. If a single row remains, the display transitions to a linear histogram (e.g., as shown in FIG. 12A), otherwise, the event data are redistributed and redisplayed based on their time of occurrence at step 430. In contrast to the vertical compress, a vertical stretch gesture may be initiated 360 to stretch the underlying graphic vertically. If the underlying graphic is a histogram, rows are added at step 470. Initially, a histogram may be vertically stretched into a number of rows that correspond to the respective event times. For example, if stacked timeline 240 (FIG. 7) was vertically compressed into linear histogram 250 shown in FIG. 12A, then vertical stretch 360 (e.g., as applied to linear histogram 250) may be used to transform linear histogram 250 into stacked timeline 240.

If the underlying graphic is a stacked timeline, rows are added at step 470 as the graphic is stretched vertically. For example, if stacked timeline 240 (FIG. 7) is subject to vertical stretch 360, rows may be added during the vertical stretch. The data for the new rows come from a shrinking time interval (e.g., much in the same way a horizontal compress operates). For example, a 24-hour interval may shrink to a 21-hour interval, to an 18-hour interval, and so on as the event graphic is stretched vertically. At some point it does not make sense to provide additional vertical stretch (e.g., additional stretch does not provide any useful information (e.g., rows with a single or few events)). This may occur when predefined system parameters determine that an empty row may be added at step 475. If an empty row is to be added, the process stops at 485. Otherwise, the event data are redistributed and redisplayed based on their time of occurrence at step 430.

The gestures discussed above (e.g., horizontal stretch gesture 350, horizontal compress gesture 310, vertical compress gesture 320, and vertical stretch gesture 360) may further be applied to a helical timeline or histogram to adjust a dimension of the cylindrical display to alter a level of granularity of the events within the cylindrical display. For example, the horizontal stretch and compress gestures alter the cylinder perimeter (and corresponding time interval), while the vertical stretch and compress gestures alter the cylinder height (and corresponding time interval), thereby adjusting the helix. The events are placed and/or stacked on the adjusted helical timeline based on their time of occurrence.

It should be noted that a 24-hour interval is a natural place to start due to the 24-hour circadian nature of the Earth. However, as described herein a cyclic artifact may arise at any interval. Furthermore, the intervals during compression or expansion may be selected based on an amount of squeeze (or compression or expansion) in the gesture. The compression or expansion may be continuous in nature or in discrete intervals (e.g., hours, quarter-hours, minutes, etc.). A pop-up graphic may be provided to give an indication of the level of compression or expansion. Furthermore, the compression or expansion scale may change based on the current level of compression or expansion. For example, if the initial interval is 24 hours, the compression may occur in one hour intervals, and when the interval reaches a 12-hour interval, the compression interval may be reduced to one-half hour intervals.

Figure 5A:
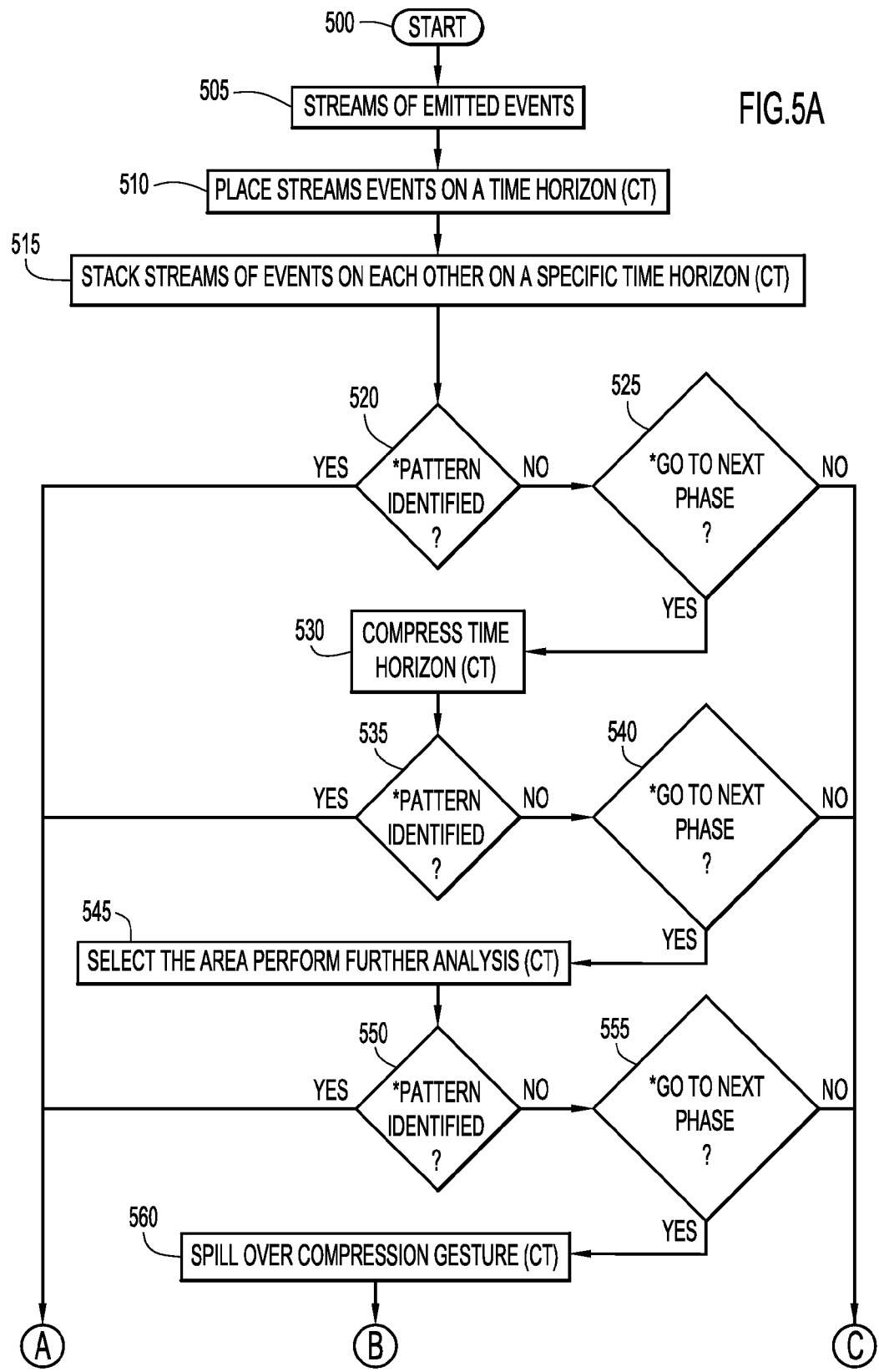
FIGS. 5A and 5B are a flow diagram illustrating plural operational scenarios in which a first display is transformed into a second display according to an embodiment of the present invention.
Figure 5B:
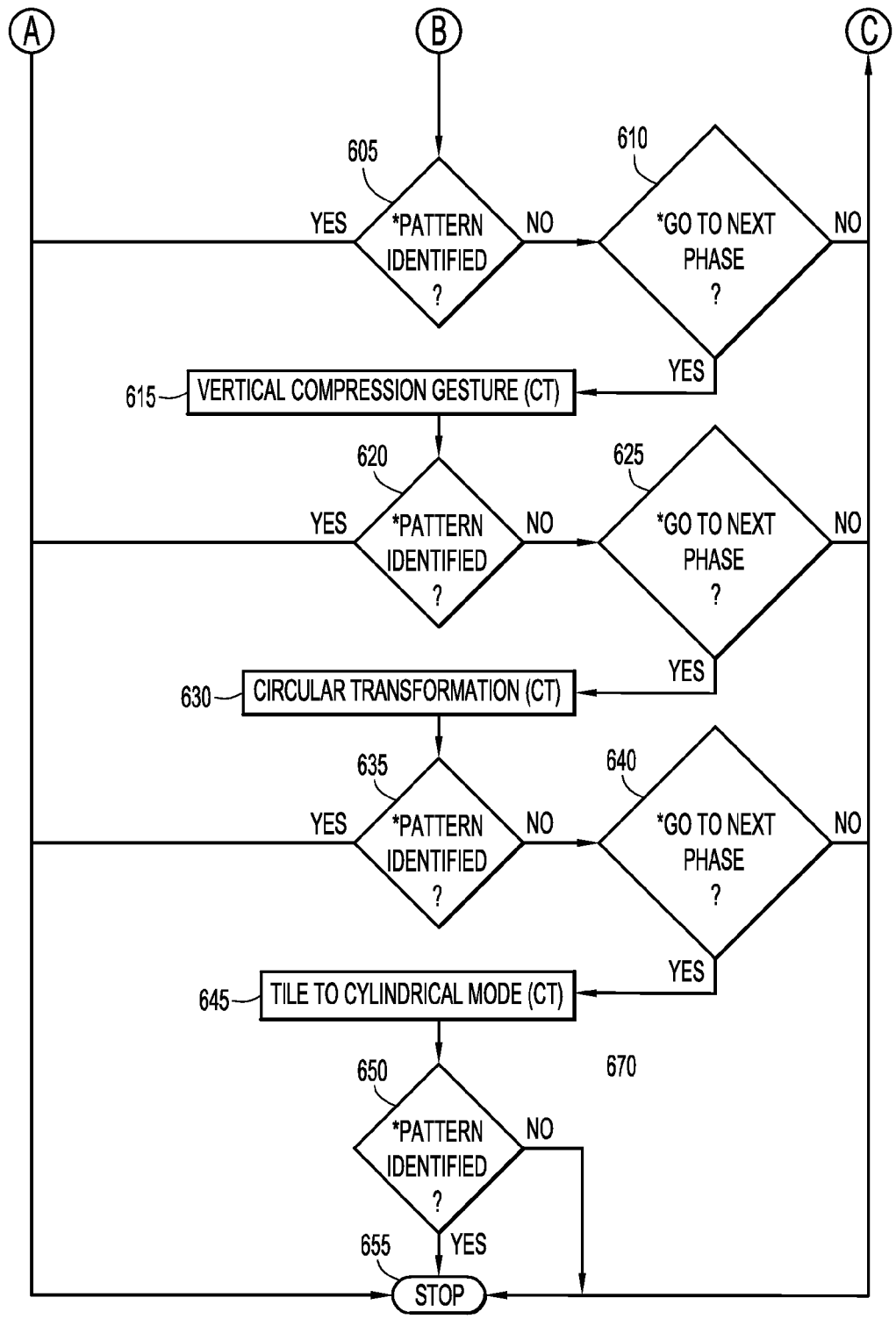

Referring now to FIGS. 5A and 5B, a flow diagram illustrating plural operational scenarios is described in which gestures are utilized to transform a first display into a second display according to an embodiment of the present invention (e.g., via visualization module 20 and server system 10 and/or client system 14). As viewed in FIGS. 5A and 5B, the abbreviation "CT" represents that data that are transformed according to the flow diagram may be in a state of continuous transformation (CT) (e.g., steps 530, 545, 560, 615, 630, and 645), and the asterisk indicates that a data analyst (or other user) or the system automatically may make the determination (e.g., steps 520, 525, 535, 540, 550, 555, 605, 610, 620, 625, 635, 640, and 650). The flow of data analysis starts at step 500. Streams of emitted events are obtained at step 505. The emitted events may be obtained by way of a query (e.g., a query to database 18 (FIG. 1)). The events may be streamed to server system 10 that may host or be coupled to a business rule management system (e.g., decision system) or a Complex Event Processing (CEP) system. The streamed or emitted events may be previously collected and stored (e.g., by collection module 16) from sensors 22.

The streams of event data may be recordings of like events. As such, the streams of events are presented on a specific time horizon at step 515 (e.g., by visualization module 20). The result may be visualization of the data (e.g., a tickertape or stacked linear timeline) that may use color, hashing, stippling and/or other visualization techniques to distinguish event types. At this point, the stacked streams 515 are parsed to determine if a pattern has been identified at step 520 (e.g., a user views the stacked streams to identify a pattern). The patterns may be recognized based on various factors (e.g., experience, cognitive skill, the ability to swap event variables to establish correlations among the data that are worthy of further exploration, etc.). If a pattern is identified, the process terminates at step 655 (FIG. 5B).

If a pattern is not identified at step 520, it is determined at step 525 as to whether further analysis is warranted. If not, the process terminates at step 655 (FIG. 5B). If the next phase of analysis is desired as determined at step 525, any number of visualization transformations may be explored including those that are suggested by the techniques described herein. Accordingly, various horizontal compressions may be used at step 530 (e.g., by way of visualization module 20).

The horizontal compression variations may be parsed to determine if a pattern has been identified at step 535. If a pattern is identified, the process terminates at step 655 (FIG. 5B). If a pattern is not identified at step 535, a decision is rendered at step 540 as to whether further analysis is warranted. If not, the process terminates at step 655 (FIG. 5B). If the next phase of analysis is desired as determined at step 540, a portion of the data in the graphic visualization may be selected for further analysis at step 545. In this regard, gesturing techniques may be utilized to "rubber band" around a portion of the data of interest to form a subset of data. The system then may cull any unselected data from consideration. The remaining, selected subset of data, can then be subject to further analysis according to any of the techniques described or suggested herein.

The selected data may be parsed to determine if a pattern has been identified at step 550. If a pattern is identified, the process terminates at step 655 (FIG. 5B). If a pattern is not identified at step 550, a decision is rendered at step 555 as to whether further analysis is warranted. If not, the process terminates at step 655 (FIG. 5B). If the next phase of analysis is desired at step 555, a compression spillover may be analyzed at step 560 according to the techniques described herein. In this regard, some spillovers that result in incomplete data (or visually incomplete linear data, annular data, or the like), may provide visual cues that may become apparent.

Referring to FIG. 5B, the process continues at step 605, to determine whether a pattern has been identified. If a pattern is identified, the process terminates at step 655. If a pattern is not identified at step 605, a decision is rendered at step 610 as to whether further analysis is warranted. If further analysis is not warranted at step 610, the process terminates at step 655. If the next phase of analysis is desired as determined at step 610, vertical compression visualization transformations may be explored at step 615 (e.g., as described above) to identify a pattern at step 620.

If a pattern is identified at step 620, the process terminates at step 655. If a pattern is not identified at step 620, a decision is rendered at step 625 as to whether further analysis is warranted. If further analysis is not warranted, the process terminates at step 655. If the next phase of analysis is desired as determined at step 625, circular transformation techniques may be explored at step 630 (e.g., as described above) to identify a pattern at step 635.

If a pattern is identified at step 635, the process terminates at step 655. If a pattern is not identified at step 635, a decision is rendered at step 640 as to whether further analysis is warranted. If further analysis is not warranted, the process terminates at step 655. If the next phase of analysis is desired as determined at step 640, tiling to cylindrical modes (e.g., helical timelines or histograms) may be explored at step 645 to identify cyclic patterns at step 650. At this point, whether or not a pattern is identified, the process terminates at step 655.

The decisions to proceed with succeeding visualizations may be based on any desired criteria (e.g., processing time, quantity of iterations, predetermined or specific order, etc.). The patterns identified may be utilized to generate rules to control actions or processing of other systems. For example, the events may include times when certain jobs or tasks are scheduled within a computer system. At certain times of a day, degraded performance is encountered. The visualizations may enable patterns to be identified at those times that indicate certain jobs or tasks are being performed that are causing the degraded performance. Rules may be generated to distribute execution of the tasks to enhance performance. The pattern identification and rules may be generated automatically by the system, or by an analyst or other user. This may be applied to various scenarios to control operation of varying systems to enhance performance.

By way of example, a simplified air transport model has been described above. However, most systems are more complex, e.g., a Complex Event Processing (CEP) system includes computer hardware and software that receive events in the form of messages, applies logic to these event-messages, and makes a decision and issues an action. For example, an intelligent highway system may include traffic monitors and digital overhead highway signs. When traffic monitors detect congestion, the monitors may update travel times posted "upstream" from the congested area to let "downstream" drivers of the congestion. The intelligent highway system may also receive accident report information and adjust the digital overhead signs accordingly.

Initially, a scenario investigation or design may take place. A system programmer authors the logic for the simple traffic system outlined above. Before the software is written, the programmer should understand traffic congestion over time and that traffic congestion is cyclic in nature, and that accidents cause congestion based on the degree of damage. The historic patterns of congestion and accidents over time are considered to develop algorithms to predict congestion and modify messages on overhead signs and change traffic signaling times (i.e., it may be beneficial to leave certain traffic signals "green" for an extended period of time).

The traffic system monitors traffic events (each vehicle passing a milestone, accident incidents, etc.) and stores this information in a database. The visualization techniques described herein may be utilized to understand how events cluster over time. For example, to examine patterns of traffic light changes, traffic flow, and how accidents cluster. Congestion patterns may be analyzed to include more complex events than the simple morning and evening rush hours. Congestion patterns may occur at many times of the day (e.g., noon, school let out and so forth). In other instances, it may be discovered that there are echo patterns (an accordion effect), i.e., a short time after congestion clears there is a paradoxical spike in accidents (because frustrated drivers try to make up for lost time).

The patterns may be discovered by viewing the stored data using the techniques of present invention embodiments described herein. The temporal information may be quickly transformed into different representations in search of these patterns. Patterns that are not apparent in one view may become apparent in another view. Thus, an advantage arises by the discovery of unanticipated patterns (e.g., patterns that occur every three hours or relationships between clusters of different types of events). Having found a few unexpected patterns, appropriate actions (e.g., define rules) may be triggered, such as lighting signs or changing traffic light times. Further, rules may be generated by an analyst or the system based on future predicted behavior (i.e., the system does not have to wait until traffic becomes congested to respond because the developed rules modify system actions (signs and traffic lights) ahead of time).

The visualizations and rule/action definitions may be tested against debugging scenarios. For example, a system of rules may be generated for detecting certain types of patterns and issuing certain types of actions (actions may also be considered a events). An analyst or other user or a system may generate test data using simulation software and read it into the visualization (display) system. An analyst may explore whether the system behaves as expected and whether or not there are unexpected or unwanted side effects. The CEP system both receives events and generates action events (which can be received and responded to in turn), and becomes a complex dynamic system (with feedback). The tools for transforming the various visualizations/graphics allows quick exploration of the behavior across multiple time scales to discern a cyclic or circadian pattern with ease.

It will be appreciated that the embodiments described above and illustrated in the drawings represent only a few of the many ways of implementing embodiments for identifying cyclic patterns of complex events.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, collection module, visualization module, etc.). These systems may include any types of monitors and input devices (e.g., keyboard, mouse, voice recognition, etc.) to enter and/or view information.

It is to be understood that the software (e.g., collection module, visualization module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., collection module, visualization module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., events, event timelines, and/or graphical representations thereof, etc.). The database system may be implemented by any number of any conventional or other databases, data stores or storage structures (e.g., files, databases, data structures, data or other repositories, etc.) to store information (e.g., events, event timelines, analysis results, etc.). The database system may be included within or coupled to the server and/or client systems. The database systems and/or storage structures may be remote from or local to the computer or other processing systems, and may store any desired data (e.g., events, event timelines, analysis results, etc.).

The present invention embodiments may employ any number of any type of user interface (e.g., Graphical User Interface (GUI), command-line, prompt, etc.) for obtaining or providing information (e.g., analyst selections and gestures), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The visualizations may include any information arranged in any fashion, and may be configurable based on rules or other criteria to provide desired information to a user.

The present invention embodiments are not limited to the specific tasks or algorithms described above, but may be utilized for identifying any types of patterns within any types of event or other information.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of revealing patterns of events in time-based data comprising:
   detecting occurrence of events of a system via a sensor network;
   generating on a processing device a first display of a linear timeline indicating the events within time-based data;
   transforming the linear timeline of the first display into a second display via the processing device that presents clustering of the events within the time-based data, wherein the second display includes one or more from the group of a stacked linear timeline of the events, a polar timeline of the events, and a helical timeline of the events;
   in response to detecting an absence in the second display of patterns of the events to identify event associations contributing to an adverse condition of the system, successively transforming the second display to one or more other timelines of the group via the processing device to reveal the patterns of the events; and
   controlling actions of the system via the processing device based on the revealed patterns to address the adverse condition.

2. The method of claim 1, wherein transforming the linear timeline further comprises:
   transforming the linear timeline of the events into the stacked linear timeline of the events within a desired time interval, wherein the stacked linear timeline includes a plurality of rows of the events.

3. The method of claim 2, wherein transforming the linear timeline further comprises:
   compressing the desired time interval of the stacked linear timeline to enable the events from a row to wrap to a succeeding row.

4. The method of claim 2, wherein transforming the linear timeline further comprises:
   compressing the rows of the stacked linear timeline to produce a linear timeline with frequency histograms each indicating occurrence of a quantity of the events.

5. The method of claim 1, wherein transforming the linear timeline further comprises:
   transforming the linear timeline of the events into the polar timeline of the events within a desired time interval, wherein the polar timeline includes a generally circular display with frequency histograms each indicating occurrence of a quantity of the events disposed about a circumference of the circular display.

6. The method of claim 5, wherein successively transforming the second display further comprises:
   transforming the polar timeline of the events into the helical timeline of the events, wherein the helical timeline of the events includes a generally cylindrical display with events indicated by a spiral path along a cylinder perimeter.

7. The method of claim 6, wherein transforming the polar timeline further comprises:
   adjusting a dimension of the cylindrical display to alter a level of granularity of the events within the cylindrical display.

8. The method of claim 1, further comprising:
   selecting a cluster of events within the second display and performing an analysis to determine a cause of the cluster of events.

9. A system for detecting patterns of events in time-based data, the system comprising:
   a sensor network to detect occurrence of events of within a second system; and
   at least one processor configured to:
      generate a first display of a linear timeline indicating the events within time-based data;
      transform the linear timeline of the first display into a second display that presents clustering of the events within the time-based data, wherein the second display includes one or more from the group of a stacked linear timeline of the events, a polar timeline of the events, and a helical timeline of the events;
      in response to detecting an absence in the second display of patterns of the events to identify event associations contributing to an adverse condition of the system, successively transform the second display to one or more other timelines of the group to reveal the patterns of the events; and
      control actions of the second system based on the revealed patterns to address the adverse condition.

10. The system of claim 9, wherein transforming the linear timeline further comprises:
    transforming the linear timeline of the events into the stacked linear timeline of the events within a desired time interval, wherein the stacked linear timeline includes a plurality of rows of the events.

11. The system of claim 10, wherein transforming the linear timeline further comprises:
compressing the desired time interval of the stacked linear timeline to enable the events from a row to wrap to a succeeding row.

12. The system of claim 10, wherein transforming the linear timeline further comprises:
compressing the rows of the stacked linear timeline to produce a linear timeline with frequency histograms each indicating occurrence of a quantity of the events.

13. The system of claim 9, wherein transforming the linear timeline further comprises:
transforming the linear timeline of the events into the polar timeline of the events within a desired time interval, wherein the polar timeline includes a generally circular display with frequency histograms each indicating occurrence of a quantity of the events disposed about a circumference of the circular display.

14. The system of claim 13, wherein successively transforming the second display further comprises:
transforming the polar timeline of the events into the helical timeline of the events, wherein the helical timeline of the events includes a generally cylindrical display with events indicated by a spiral path along a cylinder perimeter.

15. The system of claim 14, wherein transforming the polar timeline further comprises:
adjusting a dimension of the cylindrical display to alter a level of granularity of the events within the cylindrical display.

16. The system of claim 9, wherein the at least one processor is further configured to:
select a cluster of events within the second display and perform an analysis to determine a cause of the cluster of events.

17. A computer program product for revealing patterns of events in time-based data, the computer program product comprising:
a computer readable storage medium having computer readable program code embodied therewith, the computer readable program code comprising computer readable program code configured to:
generate a first display of a linear timeline indicating events of a system detected via a sensor network within time-based data;
transform the linear timeline of the first display into a second display that presents clustering of the events within the time-based data, wherein the second display includes one or more from the group of a stacked linear timeline of the events, a polar timeline of the events, and a helical timeline of the events;
in response to detecting an absence in the second display of patterns of the events to identify event associations contributing to an adverse condition of the system, successively transform the second display to one or more other timelines of the group to reveal the patterns of the events; and
control actions of the system based on the revealed patterns to address the adverse condition.

18. The computer program product of claim 17, wherein transforming the linear timeline further comprises:
transforming the linear timeline of the events into the stacked linear timeline of the events within a desired time interval, wherein the stacked linear timeline includes a plurality of rows of the events.

19. The computer program product of claim 17, wherein transforming the linear timeline further comprises:
transforming the linear timeline of the events into the polar timeline of the events within a desired time interval, wherein the polar timeline includes a generally circular display with frequency histograms each indicating occurrence of a quantity of the events disposed about a circumference of the circular display.

20. The computer program product of claim 19, wherein successively transforming the second display further comprises:
transforming the polar timeline of the events into the helical timeline of the events, wherein the helical timeline of the events includes a generally cylindrical display with events indicated by a spiral path along a cylinder perimeter.

* * * * *